Dec. 1, 1942.   R. P. DUNMIRE   2,303,623
LOW DENSITY HEATER
Filed Dec. 31, 1940   2 Sheets-Sheet 2

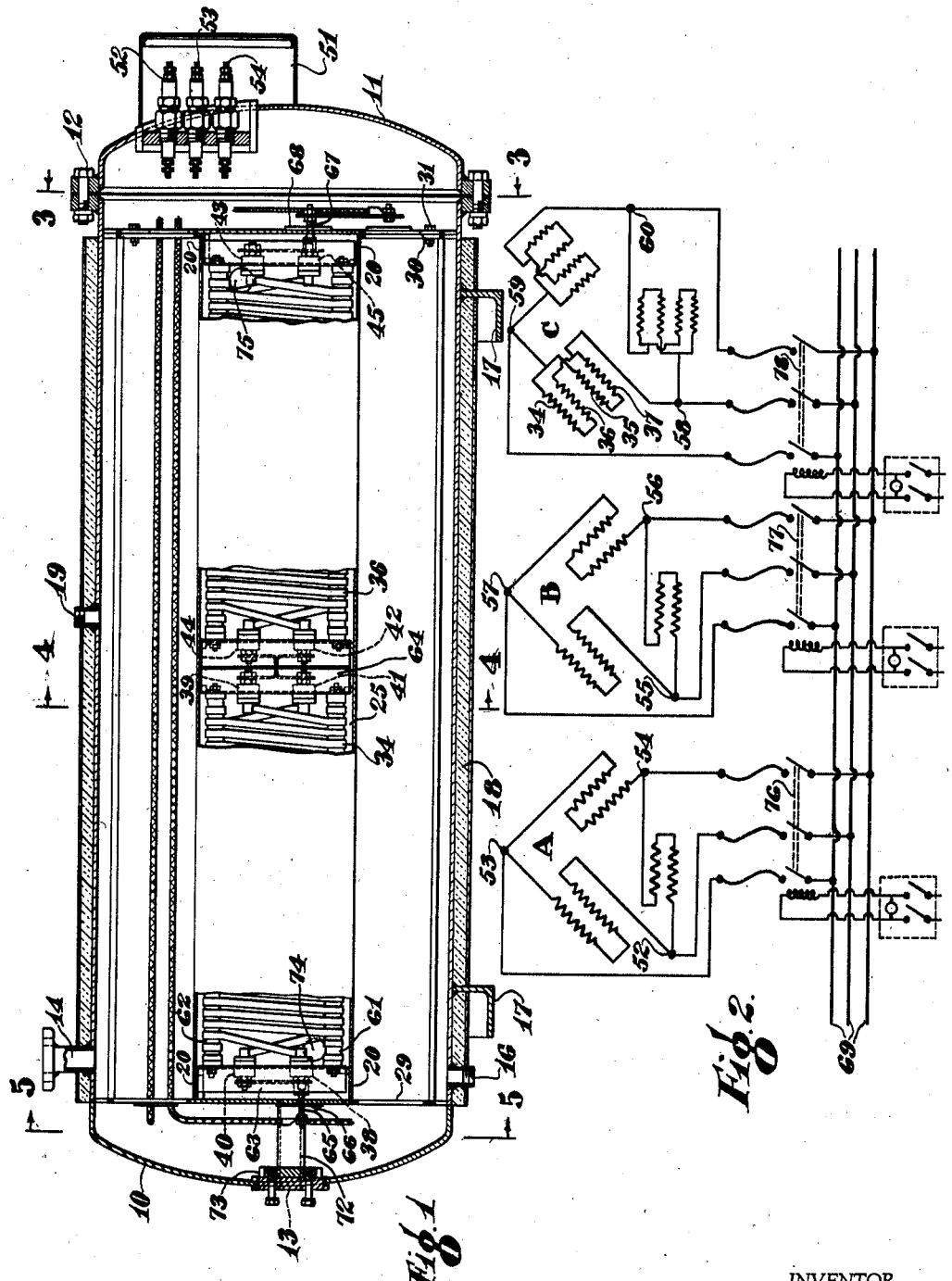

INVENTOR.
Russell P. Dunmire
BY Hoodling and Krost atty

Patented Dec. 1, 1942

2,303,623

UNITED STATES PATENT OFFICE 2,303,623

LOW DENSITY HEATER

Russell P. Dunmire, Alliance, Ohio, assignor to The Buckeye Laboratories, Inc., a corporation of Ohio Application December 31, 1940, Serial No. 372,546

6 Claims. (Cl. 219—39)

My invention relates in general to fluid heaters and more particularly to oil heaters.

When cable, transformer or circuit breaker oil has to be purified the operation can be greatly expedited by pre-heating the oil to reduce its viscosity.

It is a well known fact that any oil containing air when heated electrically by coming in contact with high surface temperatures, oxidizes at an exceedingly high rate and thereby forms sludges, acids and other deleterious products which in the presence of metal acts as a catalyzer and forms additional compounds at a greatly increased rate. One damaging effect resulting from excessive oxidation is that the ohmic resistance of the oil falls off materially after treatment. Another damaging effect is that the power factor or dissipation factor of the oil is increased to such an extent that it is rendered useless for normal application.

An object of my invention is the provision of an oil immersed heater having a low heat density per square inch of heating surface to avoid damaging the oil during treatment.

Another object of my invention is the provision of a plurality of elongated fluid cells connected in series and forming a long, continuous and tortuous path for the flow of the oil and directly heating the oil as it flows through the plurality of elongated cells.

Another object of my invention is the provision of causing the oil in adjacently connected cells to flow in a reverse direction with respect to each other and thus set up a turbulence in the oil at each reversal of direction to thoroughly mix the oil.

Another object of my invention is the provision of causing substantially no turbulence in the flow of the oil while the oil is flowing past the heating elements, thus producing a stream-lined flow.

Another object of my invention is the provision of causing turbulence in the oil at places where it is not being directly heated by the heating element and to cause substantially no turbulence in the flow of oil where it is being directly heated by the heating element.

Another object of my invention is the provision of a heating element comprising a strip of ribbon metal disposed edge-wise to the flow of the oil being treated.

Another object of my invention is the provision of an oil immersed heater having a very high operating efficiency.

Another object of my invention is the provision of a plurality of fluid cells capable of withstanding high pressure and arranged to be readily removable for inspection and repairs.

Another object of my invention is the provision of heating the oil as it flows through the long, continuous and tortuous path by means of a plurality of heating elements which may be electrically connected in any suitable manner either in series, in parallel or in series-parallel, or from a single phase, two-phase, or three-phase supply circuit, and either in star or delta arrangement.

Another object of my invention is the provision of an oil heater which has a minimum of pressure drop.

Other objects and a fuller understanding of my invention may be had by referring to the following description and claims, taken in conjunction with the accompanying drawings, in which:

Figure 1 represents a longitudinal cross-sectional view of an oil heater embodying the features of my invention, taken along the line 1—1 of Figure 4;

Figure 2 is a diagrammatical electrical arrangement for the electrical heating elements of my invention;

Figure 3:
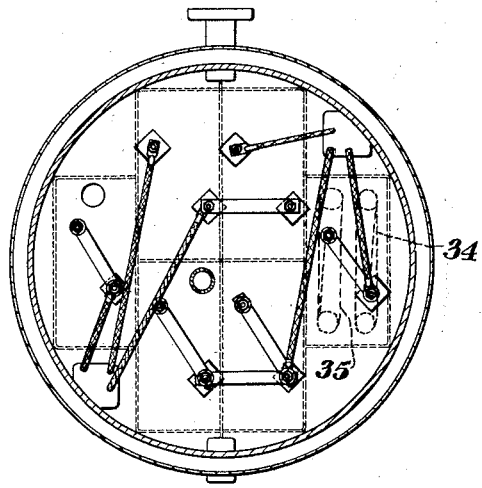
Figure 3 is a cross-sectional view of my heater taken along the line 3—3 of Figure 1.

With reference to the drawings, my invention comprises a container or drum 10 having a plurality of elongated fluid cells 23, 24, 25, 26, 27 and 28 longitudinally mounted therein to provide a long, continuous, and tortuous path for the flow of the fluid therethrough. As illustrated in Figure 1, the container or drum 10 is provided with a removable end 11 secured thereto by means of a series of bolts 12 passing through external flanges suitably welded or otherwise fastened to the end of the container and the removable end 11. An inlet opening 13 is provided in the left-hand end of the container 10 and an outlet opening 14 is provided in the upper side wall thereof. Both of the inlet and outlet openings are provided with flanges so that my heater may be connected in fluid circuit relation with a pump or any other device for forcing the oil through the elongated cells and the drum of my heater. The container or drum 10 may be supported by legs 17 in a longitudinal manner as shown in Figure 1 and the outside of the container or drum may be covered by means of any suitable insulation 18 to reduce heat losses. A drain connection 16 may be provided upon the under side wall of the container or drum 10 and a vent or relief valve opening connection 19 may be provided in the upper side wall of the container or drum 10.

The elongated cells 23 to 28, inclusive, may be constructed in any suitable manner, such for example, cut of suitable metal shaped to form a rectangular or any other shaped opening. The left-hand end of the elongated cells may be closed by means of a plate 29 and the right-hand end of the elongated cells may be enclosed by means of a plate 30. The ends of the elongated cells may be welded or otherwise suitably connected to the end plates 29 and 30.

Figure 4:
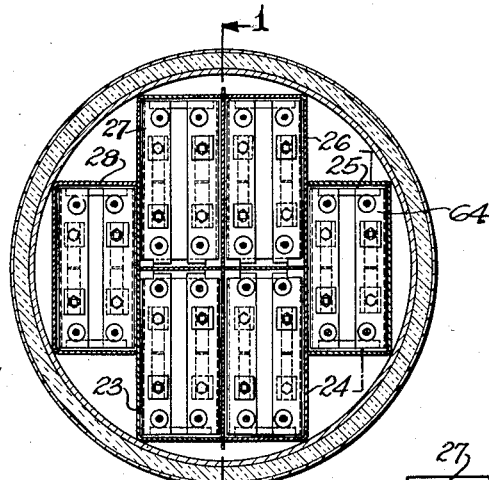
Figure 4 is a cross-sectional view of my heater taken along the line 4—4 of Figure 1.
Figure 5:
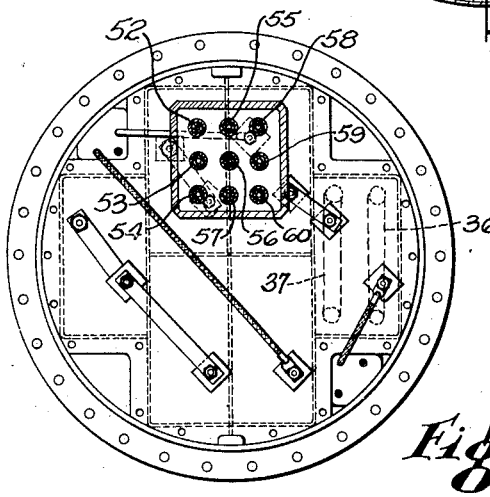
Figure 5 is a cross-sectional view taken along the line 5—5 of Figure 1.

Mounted in each of the elongated cells are four heating elements. While I have illustrated four heating elements, it is to be clearly understood that any other number may be employed to electrically heat the oil flowing through the elongated cells. The heating elements in each of the elongated cells are identical. Therefore, the description will be confined to the heating elements as shown in Figure 1 and being in cell 25 as shown in Figures 4 and 5. The two heaters in the left-hand end of the elongated cell 25 are identified by the reference characters 34 and 35 and the two heaters in the right-hand end of the elongated cell 25 are designated by the reference characters 36 and 37. The terminals for the heating element 34 are identified by the reference characters 38 and 39, the terminals for the heating element 35 by the reference characters 40 and 41, the terminals for the heating element 36 by the reference characters 42 and 43, and the terminals for the heating element 37 by the reference characters 44 and 45. The heating elements 34 and 35 are connected in parallel and the heating elements 36 and 37 are connected in parallel and the two sets of parallel heating elements are connected in series, see the diagrammatic circuit in Figure 2. To accomplish this circuit connection, the terminals 38 and 40 are connected together at the left-hand end of the heaters 34 and 35 and the terminals 43 and 45 are connected together at the right-hand end of the heating elements 36 and 37. Between the heating elements, the terminal 39 is connected to the terminal 42 and the terminal 41 is connected to the terminal 44. Each of the heating elements comprises a strip of ribbon metal composed of nickel chromium alloy or any other suitable resistance material and is coiled around two spaced insulated supports, which in the heating element 34 is identified by the reference characters 61 and 62. Again directing the attention to the heating element 34, the two insulated supports 61 and 62 may be carried upon opposite ends by angle iron members 63 and 64 which also carry respectively terminals 38 and 40, and 39 and 41. In other words, one complete heating element comprises the two-spaced insulated support 61 and 62, the two end angle irons 63 and 64, the ribbon metal coiled around the two spaced insulated supports 61 and 62, and the terminals 38 and 40 carried by the angle iron 63 and the terminals 39 and 41 carried by the angle iron 64. The heating element 35 is identical to the heating element 34 and is disposed side by side within the left-hand end of the elongated cell 25. The heating elements 36 and 37 are identical to the heating element 34 and they are disposed side by side in the right-hand end of the elongated cell 25. The heating elements for the other elongated cells are the same as those mounted in the elongated cell 25.

The heating elements may be connected in series, in series-parallel, in parallel, or in any other suitable combination and from any suitable supply source including single-phase, two-phase or three-phase, or in star or in delta. In the embodiment illustrated, there are 24 heating elements and a suitable circuit which I have found to be successful for operating the 24 heating elements is shown in Figure 2 in which the heating elements 34, 35, 36 and 37 are shown as being connected in series-parallel. The 24 heating elements may be divided up into three groups, namely, A, B and C, wherein each group of heating elements may be sectionally connected to a suitable supply source 69. Thus, the bank of heaters A are electrically energized upon the closure of the switch 76, the bank of heaters B are energized upon the closure of the switch 77 and the bank of heating elements C are energized upon the closure of the switch 78. The terminal connections for the heating elements are mounted in a junction box 51 upon the removable end 11 of the drum. With reference to Figures 2 and 5, the terminals are identified by the reference characters 52, 53, 54, 55, 56, 57, 58, 59 and 60. The arrangement of the electrical wiring from the terminals in the terminal box 51 to the terminal of the heating element is shown in the diagrammatic view of Figure 2. The conductor which leads to the heating elements 34 and 35 is electrically connected to the terminal 38 by means of a connector 65 that extends through the left hand plate 29 and which is insulated therefrom by means of an insulating plate 66. An electrical connector 67 is likewise connected to the terminal 45 of the heating element 36 and extends through the outside of the right-hand end plate 30 and is insulated therefrom by means of an insulated plate 68 as shown in Figure 1. The externally exposed connectors 65 and 67 as well as other connectors for the heating elements in the other cells may be connected by conductors as well as interconnecting straps of any suitable form.

Figure 6:
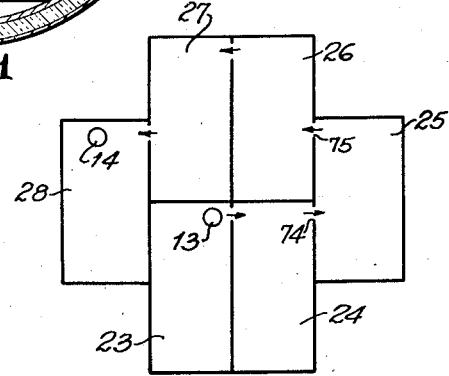
Figure 6 is a diagrammatical view showing the flow of the oil through the plurality of cells which comprise my heater.

The flow of the oil through the elongated cells is shown diagrammatically in Figure 6, in which the fluid enters the cell 23, flows into the cell 24, the cell 25, the cell 26, the cell 27 and the cell 28 to the outlet openings. As shown in Figure 1, the fluid upon entering the inlet opening 13 flows through a pipe 72 to the top of the left-hand plate 29 where it enters the cell 23. A pipe 72 is welded at its right-hand end to the plate 29 and is provided with a flange 73 upon its left-hand end and is adapted to be bolted or otherwise suitably connected to the flange of the inlet opening 13. As shown in Figures 1 and 6, the inlet opening for the cell 25 is designated by the reference character 74 and the outlet opening for the cell 25 is designated by the reference character 75. With reference to Figure 1 of the drawings, the inlet opening 74 is at the left-hand end of the cell 25 and the outlet opening is at the right-hand end of the cell 25. This means that the fluid enters the cell 25 at the left-hand end and flows towards the right hand end and then flows into the cell 26, whereupon the fluid flows back to the left-hand end thereof. That is to say, the adjacent cells are connected in reverse series and cause the oil in the adjacent cells to flow in a reverse direction with respect to each other, thus setting up a turbulence in the oil at each reversal of direction to thoroughly mix the oil.

The oil upon flowing out of the cell 28 flows into the container or drum 10 and then out of the outlet 14. Thus, with my structural cell arrangement I provide a long and continuous and tortuous path for the flow of the fluid as it is directly heated by the heating elements themselves. The heating elements as explained hereinbefore are constructed of relatively thin ribbon strips of metal disposed edge-wise to the flow of the oil and thus produces what may be characterized as a stream-lined flow. That is to say, the thin resistance strips are such that as the oil flows past them there is no localized turbulence back of the strip of resistance heating element. That is to say, the heating elements are completely surrounded at all times by the oil and there are no portions of the heating elements left unexposed to the oil by reason of any turbulence set up in the oil passing the strips of ribbon heating element. In case of turbulence, there might be a dry spot upon the heating element which dry spot would tend to cause the heating element at the dry spot to increase in temperature and oxidize the fluid or oil. The thinness of the ribbon strip of resistance material reduces the turbulence and the dry spot to a minimum so that in my invention there is substantially no oxidation of the oil resulting from the presence of highly heated air or gases in the vortex. Thus, in my invention I provide for causing a turbulence in the oil at the ends of the cells where the oil is not being directly heated by the heating elements and of causing substantially no turbulence in the flow of the oil where it is being directly heated by the heating elements.

In other words, my invention provides streamlined flow of the fluid when it is being directly heated by the heating elements and a turbulent flow at each end of the cells where the fluid changes its direction of flow from one cell to another.

The turbulence as the oil flows past the heating elements is materially reduced by reason of the fact that the spacing between the elements is less than the width of the ribbon resistance heating element itself. The spacing between each coil of heating element is sufficient for insulation purposes and is not sufficient to interfere with the stream-lined flow of the oil upon the heating surfaces. For oils, I prefer to employ a heat density in the neighborhood of one watt or less per square inch of heating surface. I accomplish this by making the heating element of ribbon strips of metal, preferably of nickel chromium alloy. For oils the temperature may be heated to 360 degrees Fahrenheit or higher and the temperature rise is gradual from the inlet opening to the outlet opening. For other materials besides oil the temperature may be varied to obtain successful results.

The entire battery of cells 23 to 28 may be withdrawn from the container or drum 10 by removing the end cover 11 and slidably pulling the entire assembly therefrom. The right-hand end of the elongated cells 23 to 28 may likewise be removed by disassembling the right-hand plates 30 by dis-engaging the nuts and bolts 31. With the right-hand plate 30 removed, each of the heating elements may be withdrawn from the right-hand end of the elongated cells for inspection and repair. By means of this construction the heating elements and the cells are arranged for ready inspection and repair and for the replacement of new parts when required.

I find that my heater is substantially 99 percent efficient inasmuch as the oil is directly in contact with the heating elements themselves. The elongated cells may be designed for high pressure so that the oil may be forced through my heater by means of a pump or any other pressure device. The drop in pressure of the fluid as it flows through the elongated cells is reduced to a minimum by reason of the fact that the heating element ribbons are disposed edge-wise to the flow of the fluid or oil.

Each of the fluid cells may be vented at each end by the small openings 20 to allow gases and oil to escape to the large container or drum 10 whereupon they may be vented to atmosphere through the vent or relief connection 19.

Although I have described my invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

I claim as my invention:

1. A cellular fluid heater structure comprising, in combination, a plurality of nested elongated fluid cells disposed side-by-side with reference to each other and adjacently connected together to form a long, continuous and tortuous path for the flow of the oil therethrough, the connection between adjacent cells connecting said cells in reverse series and causing the oil in said adjacent cells to flow in a reverse direction with respect to each other, an electric heating element removably mounted in each of the cells and directly heating the oil itself, said cells having common wall portions separating one from another and an opening in the common wall portions to provide fluid communication from one to another to form said tortuous path, said cells having side walls angularly disposed with reference to each other, said side walls including said common wall portions, said nested cells having opposing ends to enclose said heating elements in the cells, one of said opposing ends comprising a relatively flat member common to all the cells and being readily removable to give access to all the cells to facilitate the insertion or withdrawal of the heating elements in or from the cells, a container for said nested cells, means for removably mounting said cells in said container, said container having a readily removable portion to give access to the relatively flat member and the cells for inserting the heating elements in or withdrawing them from the cells, as well as for inserting and withdrawing the cells themselves in and from the said container.

2. A cellular fluid heater structure comprising, in combination, a plurality of nested elongated fluid cells disposed side-by-side with reference to each other and adjacently connected together to form a long, continuous and tortuous path for the flow of the oil therethrough, the connection between adjacent cells connecting said cells in reverse series and causing the oil in said adjacent cells to flow in a reverse direction with respect to each other, an electric heating element removably mounted in each of the cells and directly heating the oil itself, said cells having common wall portions separating one from another and an opening in the common wall portions to provide fluid communication from one to another to form said tortuous path, said cells having side walls angularly disposed with reference to each other, said side walls including said common wall portions, said nested cells having opposing ends to enclose said heating elements in the cells, one of said opposing ends comprising a relatively flat member common to all the cells and being readily removable to give access to all the cells to facilitate the insertion or withdrawal of the heating elements in or from the cells, a container for said nested cells, means for removably mounting said cells in said container, said container having a readily removable portion to give access to the relatively flat member and the cells for inserting the heating elements in or withdrawing them from the cells, as well as for inserting and withdrawing the cells themselves in and from the said container, each of said electric heating elements comprising a coiled strip of ribbon metal with the coils disposed edgewise to the flow of the fluid through the cells.

3. A cellular fluid heater structure comprising, in combination, a plurality of nested elongated fluid cells disposed side-by-side with reference to each other and adjacently connected together to form a long, continuous and tortuous path for the flow of the oil therethrough, the connection between adjacent cells connecting said cells in reversed series and causing the oil in said adjacent cells to flow in a reverse direction with respect to each other, an electric heating element removably mounted in each of the cells and directly heating the oil itself, said cells having common wall portions separating one from another and an opening in the common wall portions to provide fluid communication from one to another to form said tortuous path, said cells having side walls angularly disposed with reference to each other, said side walls including said common wall portions, said nested cells having opposing ends to enclose said heating elements in the cells, one of said opposing ends comprising a relatively flat member common to all the cells and being readily removable to give access to all the cells to facilitate the insertion or withdrawal of the heating elements in or from the cells, a container for said nested cells, means for removably mounting said cells in said container, said container having a readily removable portion to give access to the relatively flat member and the cells for inserting the heating elements in or withdrawing them from the cells, as well as for inserting and withdrawing the cells themselves in and from the said container, each of said electric heating elements comprising a coiled strip of ribbon metal with the ribbon metal disposed edge-wise to the flow of the oil through the cells, the spacing between adjacent coils of the ribbon metal being less than the width of the ribbon metal.

4. A cellular fluid heater structure comprising, in combination, a plurality of nested elongated fluid cells disposed side-by-side with reference to each other and adjacently connected together to form a long, continuous and tortuous path for the flow of the oil therethrough, the connection between adjacent cells connecting said cells in reverse series and causing the oil in said adjacent cells to flow in a reverse direction with respect to each other, an electric heating element removably mounted in each of the cells and directly heating the oil itself, said nested cells having opposing ends to enclose said heating elements in the cells, one of said opposing ends comprising a relatively flat member common to all the cells and being readily removable to give access to all the cells to facilitate the insertion or withdrawal of the heating elements in or from the cells, a container for said nested cells, means for removably mounting said cells in said container, said container having a readily removable portion to give access to the relatively flat member and the cells for inserting the heating elements in or withdrawing them from the cells, as well as for inserting and withdrawing the cells themselves in and from the said container.

5. A cellular fluid heater structure comprising, in combination, a plurality of nested elongated fluid cells disposed side-by-side with reference to each other and adjacently connected together to form a long, continuous and tortuous path for the flow of the oil therethrough, the connection between adjacent cells connecting said cells in reverse series and causing the oil in said adjacent cells to flow in a reverse direction with respect to each other, an electric heating element removably mounted in each of the cells and directly heating the oil itself, said nested cells having opposing ends to enclose said heating elements in the cells, one of said opposing ends comprising a relatively flat member common to all the cells and being readily removable to give access to all the cells to facilitate the insertion or withdrawal of the heating elements in or from the cells, a container for said nested cells, means for removably mounting said cells in said container, said container having a readily removable portion to give access to the relatively flat member and the cells for inserting the heating elements in or withdrawing them from the cells, as well as for inserting and withdrawing the cells themselves in and from the said container, each of said electric heating elements comprising a coiled strip of ribbon metal with the ribbon metal disposed edge-wise to the flow of the oil through the cells.

6. A cellular fluid heater structure comprising, in combination, a plurality of nested elongated fluid cells disposed side-by-side with reference to each other and adjacently connected together to form a long, continuous and tortuous path for the flow of the oil therethrough, the connection between adjacent cells connecting said cells in reverse series and causing the oil in said adjacent cells to flow in a reverse direction with respect to each other, an electric heating element removably mounted in each of the cells and directly heating the oil itself, said nested cells having opposing ends to enclose said heating elements in the cells, one of said opposing ends comprising a relatively flat member common to all the cells and being readily removable to give access to all the cells to facilitate the insertion or withdrawal of the heating elements in or from the cells, a container for said nested cells, means for removably mounting said cells in said container, said container having a readily removable portion to give access to the relatively flat member and the cells for inserting the heating elements in or withdrawing them from the cells, as well as for inserting and withdrawing the cells themselves in and from the said container, each of said electric heating elements comprising a coiled strip of ribbon metal with the ribbon metal disposed edge-wise to the flow of the oil through the cells, the heating capacity of the heating elements being one watt or less per square inch of heating surface.

RUSSELL P. DUNMIRE.